United States Patent

Hong et al.

(10) Patent No.: US 9,651,735 B2
(45) Date of Patent: May 16, 2017

(54) OPTICAL FIBER ARRAY FOR ACHIEVING CONSTANT COLOR OFF-AXIS VIEWING

(71) Applicant: SnapTrack, Inc., San Diego, CA (US)

(72) Inventors: John H. Hong, San Clemente, CA (US); Jian J. Ma, Carlsbad, CA (US); Bing Wen, Poway, CA (US); Tallis Y. Chang, San Diego, CA (US)

(73) Assignee: SnapTrack, Inc., San Diego, CA (US)

( * ) Notice: Subject to any disclaimer, the term of this patent is extended or adjusted under 35 U.S.C. 154(b) by 321 days.

(21) Appl. No.: 14/056,720

(22) Filed: Oct. 17, 2013

(65) Prior Publication Data

US 2015/0070750 A1 Mar. 12, 2015

Related U.S. Application Data

(60) Provisional application No. 61/876,673, filed on Sep. 11, 2013.

(51) Int. Cl.
| | |
|---|---|
| *G02B 26/00* | (2006.01) |
| *H01S 3/00* | (2006.01) |
| *H04B 10/25* | (2013.01) |
| *G02B 6/04* | (2006.01) |
| *G06F 3/01* | (2006.01) |
| *G09G 5/00* | (2006.01) |
| *G02B 6/08* | (2006.01) |

(52) U.S. Cl.
CPC ............. *G02B 6/04* (2013.01); *G02B 26/001* (2013.01); *G06F 3/01* (2013.01); *G09G 5/00* (2013.01); *G02B 6/08* (2013.01)

(58) Field of Classification Search
USPC ....... 359/237, 242, 247, 290, 291, 292, 295, 359/296, 298
See application file for complete search history.

(56) References Cited

U.S. PATENT DOCUMENTS

| | | | |
|---|---|---|---|
| 2,825,260 A | 3/1958 | O'brien | |
| 2,992,587 A | 7/1961 | Hicks, Jr. et al. | |
| 5,748,825 A * | 5/1998 | Rockwell, III | ............... 385/126 |

(Continued)

FOREIGN PATENT DOCUMENTS

| | | |
|---|---|---|
| KR | 20120129461 A | 11/2012 |
| WO | 0206865 A2 | 1/2002 |

(Continued)

OTHER PUBLICATIONS

International Search Report and Written Opinion—PCT/US2014/054072—ISA/EPO—Nov. 4, 2014.

(Continued)

*Primary Examiner* — Joseph P Martinez
*Assistant Examiner* — Brandi Thomas
(74) *Attorney, Agent, or Firm* — Weaver Austin Villeneuve & Sampson LLP

(57) ABSTRACT

Some implementations described herein involve defining a viewing angle range, also referred to herein as a viewing cone. The viewing cone may be produced by an array of optical fibers on a display. The optical fiber array may include tapered optical fibers that are capable of increasing the amount of light transmitted through the optical fiber array. The optical fiber array may be a graded index optical fiber array, wherein the refractive index of the optical fiber cores varies along the axis of the optical fibers.

20 Claims, 13 Drawing Sheets

Speckle Pattern

Modified Speckle Pattern

(56) References Cited

U.S. PATENT DOCUMENTS

| | | | |
|---|---|---|---|
| 5,894,058 | A | 4/1999 | Hatakeyama et al. |
| 6,679,998 | B2 | 1/2004 | Knappenberger et al. |
| 6,682,875 | B2 | 1/2004 | Kriksunov et al. |
| 7,057,832 | B2 | 6/2006 | Wu et al. |
| 9,028,704 | B2 | 5/2015 | Takizawa et al. |
| 9,039,996 | B2 | 5/2015 | Pesaturo et al. |
| 2009/0003786 | A1* | 1/2009 | Takahashi ............ G02B 6/022 385/123 |
| 2009/0231358 | A1 | 9/2009 | Ellwood, Jr. |
| 2010/0055397 | A1 | 3/2010 | Kurihara et al. |
| 2010/0073637 | A1* | 3/2010 | Matsumoto et al. ........ 353/30 |
| 2010/0221866 | A1 | 9/2010 | Graham et al. |
| 2011/0135881 | A1 | 6/2011 | Burkhardt |
| 2011/0293231 | A1 | 12/2011 | Van et al. |
| 2011/0294295 | A1 | 12/2011 | Zhu et al. |
| 2012/0327288 | A1* | 12/2012 | Gruhlke et al. ............ 348/340 |
| 2015/0251917 | A1 | 9/2015 | Hong et al. |

FOREIGN PATENT DOCUMENTS

| | | |
|---|---|---|
| WO | 0242809 A1 | 5/2002 |
| WO | 2007046100 A2 | 4/2007 |

OTHER PUBLICATIONS

International Search Report and Written Opinion—PCT/US2014/060658—ISA/EPO—Jan. 28, 2015.

* cited by examiner

OPTICAL FIBER ARRAY FOR ACHIEVING CONSTANT COLOR OFF-AXIS VIEWING

PRIORITY CLAIM

This application claims priority to U.S. Provisional Patent Application No. 61/876,673, filed on Sep. 11, 2013 and entitled "OPTICAL FIBER ARRAY FOR ACHIEVING CONSTANT COLOR OFF-AXIS VIEWING, which is hereby incorporated by reference.

TECHNICAL FIELD

This disclosure relates to electromechanical systems and devices, and more particularly to electromechanical systems for implementing reflective display devices.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interference. In some implementations, an IMOD display element may include a pair of conductive plates, one or both of which may be transparent and/or reflective, wholly or in part, and capable of relative motion upon application of an appropriate electrical signal. For example, one plate may include a stationary layer deposited over, on or supported by a substrate and the other plate may include a reflective membrane separated from the stationary layer by an air gap. The position of one plate in relation to another can change the optical interference of light incident on the IMOD display element. IMOD-based display devices have a wide range of applications, and are anticipated to be used in improving existing products and creating new products, especially those with display capabilities.

Some IMODs are bi-stable IMODs, meaning that they can be configured in only two positions, open or closed. A single image pixel may include three or more bi-stable IMODs, each of which corresponds to a subpixel. In a display device that includes multi-state interferometric modulators (MS-IMODs) or analog IMODs (A-IMODs), a pixel's reflective color may be determined by the gap spacing or "gap height" between an absorber stack and a reflector stack of a single IMOD. Some A-IMODs may be positioned in a substantially continuous manner between a large number of gap heights, whereas MS-IMODs may generally be positioned in a smaller number of gap heights. As a result, an A-IMOD may be considered as a special case of the class of MS-IMODs— that is, as an MS-IMOD with a very large number of controllable gap heights. Accordingly, A-IMODs and MS-IMODs may both be referred to herein as MS-IMODs, or simply as IMODs.

In reflective displays such as IMOD displays or polarization control displays (e.g., liquid crystal displays (LCDs)), off-axis viewing often leads to unwanted shifts in color or even contrast reversal. In an MS-IMOD display, this effect is especially pronounced when a pixel is displaying a reddish color, as the reflectance peak of any color shifts towards the blue.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus that may include a display, a substantially transparent substrate and an array of optical fibers disposed between the substrate and the display. The array of optical fibers may be capable of transmitting light between the substrate and the display. The array of optical fibers may include optical fibers having substantially random lengths.

In some implementations, the array of optical fibers may be capable of defining a viewing angle range for the display. The array of optical fibers may include optical fibers having tapered optical fiber cores. Low-index optical fiber cladding material may be disposed between the tapered fiber cores. For example, the optical fiber cladding material may include light-absorbing material. In some implementations, the array of optical fibers may include optical fibers having optical fiber cores with a graded index of refraction that varies along an axis of the optical fibers.

The apparatus may include a source of substantially incoherent light capable of illuminating the array of optical fibers. In some such implementations, light emerging from a first fiber in the array and light emerging from a second fiber in the array may be mutually incoherent.

A display device may include the apparatus. The display device may include an interferometric modulator (IMOD) display. The display device may include a control system capable of controlling the display device. The control system may be capable of processing image data.

The display device may include a driver circuit capable of sending at least one signal to a display of the display device and a controller capable of sending at least a portion of the image data to the driver circuit. The control system also may include a processor and an image source module capable of sending the image data to the processor. The image source module may include at least one of a receiver, transceiver, and transmitter. The display device also may include an input device capable of receiving input data and of communicating the input data to the control system.

Another innovative aspect of the subject matter described in this disclosure can be implemented in a device that includes apparatus for displaying images, a substantially transparent substrate and apparatus for transmitting light between the substrate and the display. The apparatus for transmitting light may include an array of optical fibers disposed between the substrate and the apparatus for displaying images. The array of optical fibers may be capable of defining a viewing angle range for the display.

In some implementations, each optical fiber of the array of optical fibers may include an optical fiber core and an optical fiber cladding. Refractive indices of the optical fiber core and the optical fiber cladding may be selected to provide the viewing angle range. In some implementations, a numerical aperture of each optical fiber may be based, at least in part, on a square root of a difference between the refractive indices of the optical fiber core and the optical fiber cladding.

In some implementations, the array of optical fibers may include optical fibers having substantially random lengths. According to some implementations, each optical fiber of the array of optical fibers may be longer than a minimum length. The minimum length may be based, at least in part, on an optical fiber diameter and/or an optical fiber core index of refraction.

According to some implementations, the array of optical fibers may include optical fibers having tapered optical fiber cores. In some examples, the array of optical fibers may include optical fibers having optical fiber cores with a graded index of refraction that varies along an axis of the optical fibers.

Details of one or more implementations of the subject matter described in this specification are set forth in the accompanying drawings and the description below. Although the examples provided in this summary are primarily described in terms of electromechanical systems (EMS) based displays, the concepts provided herein may apply to other types of displays, such as liquid crystal displays (LCDs), organic light-emitting diode (OLED) displays, electrophoretic displays, and field emission displays, as well as to other non-display EMS devices, such as EMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
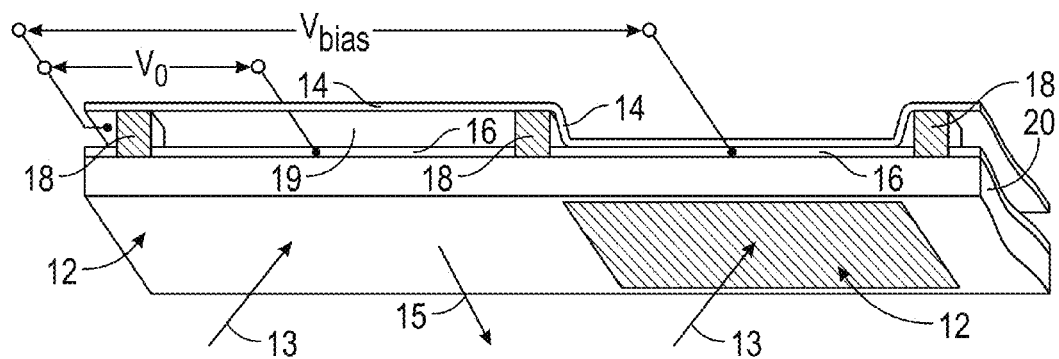
FIG. 1 shows an isometric view illustration depicting two adjacent example interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that is capable of displaying an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some implementations described herein involve defining a viewing angle range (also referred to herein as a viewing cone). The viewing cone may be produced by an array of optical fibers on a display, such as an IMOD display. In some implementations, the optical fiber array includes tapered optical fibers that are capable of increasing the amount of light transmitted through the optical fiber array. The optical fiber array may be a graded index optical fiber array, wherein the refractive index of the optical fiber cores varies along the axis of the optical fibers.

Particular implementations of the subject matter described in this disclosure can be implemented to realize one or more of the following potential advantages. Some implementations may provide a reflective display for which the rendered color provided by the display does not change appreciably within the viewing angle range. Outside the viewing angle range, the display may appear dark, so that the viewing cone can be considered a privacy zone. In some implementations, tapered optical fibers may provide a high aperture ratio and may increase the amount of light transmitted through the optical fiber array and better control of the off axis viewing characteristics.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent example interferometric modulator (IMOD) display elements in a series or array of display elements of an IMOD display device. The IMOD display device includes one or more interferometric EMS, such as MEMS, display elements. In these devices, the interferometric MEMS display elements can be positioned in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be capable of reflecting predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage $V_{bias}$ applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the display element 12 on the left is insufficient to cause actuation of the movable reflective layer 14 to an actuated position such as that of the display element 12 on the right.

In FIG. 1, the reflective properties of IMOD display elements 12 are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20. Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be adapted to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 μm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
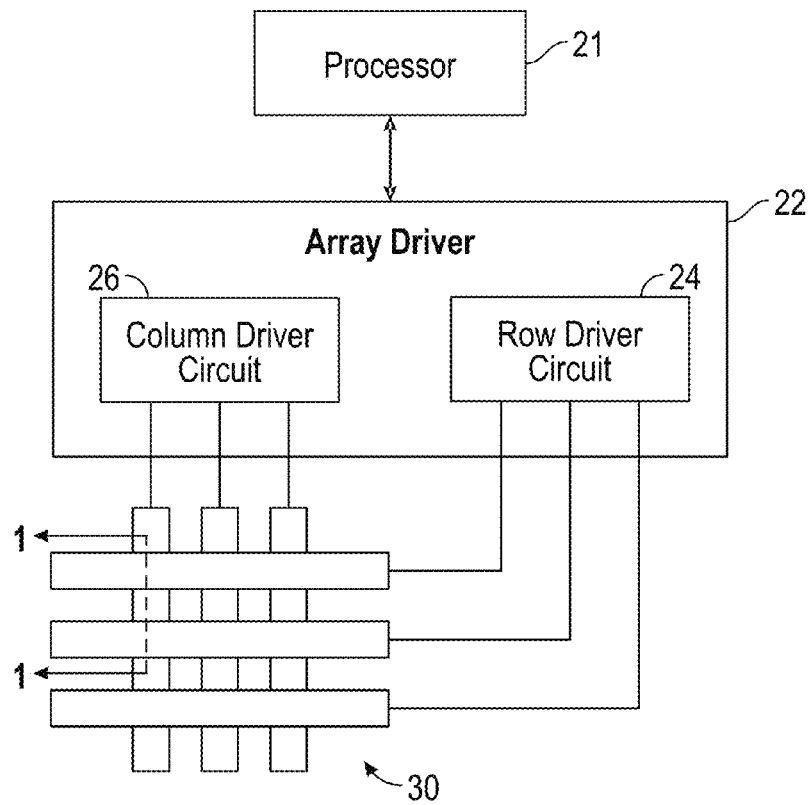
FIG. 2 shows a system block diagram illustrating an example electronic device incorporating an IMOD-based display including a three element by three element array of IMOD display elements.

FIG. 2 shows a system block diagram illustrating an example electronic device incorporating an IMOD-based display including a three element by three element array of IMOD display elements. The electronic device includes a processor 21 that may be capable of executing one or more software modules. In addition to executing an operating system, the processor 21 may be capable of executing one or more software applications, including a web browser, a telephone application, an email program, or any other software application.

The processor 21 can be capable of communicating with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

Figure 3:
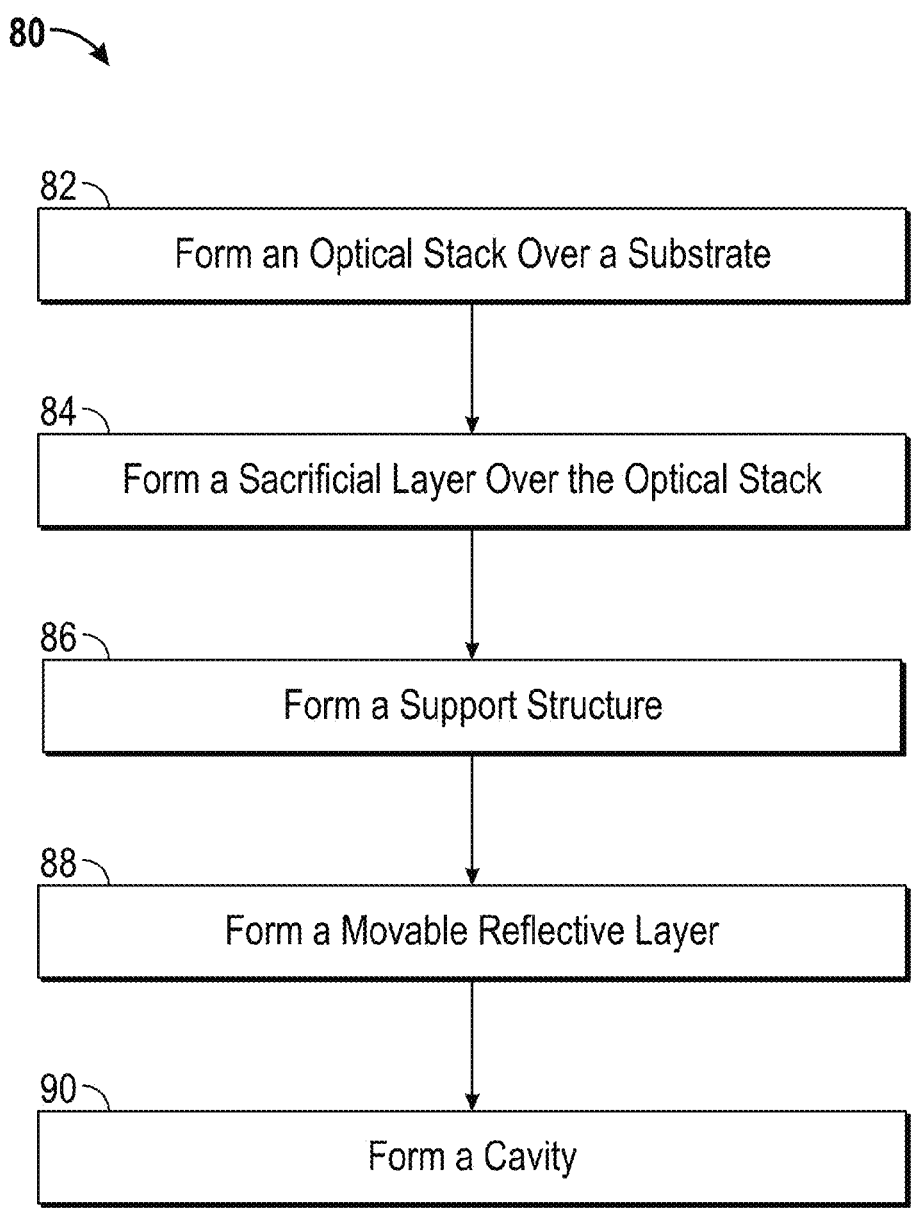
FIG. 3 shows a flow diagram illustrating an example manufacturing process for an IMOD display or display element.

FIG. 3 shows a flow diagram illustrating an example manufacturing process for an IMOD display or display element. FIGS. 4A-4E show cross-sectional illustrations of various stages in an example manufacturing process for making an IMOD display or display element. In some implementations, the manufacturing process 80 can be implemented to manufacture one or more EMS devices, such as IMOD displays or display elements. The manufacture of such an EMS device also can include other blocks not shown in FIG. 3. The process 80 begins at block 82 with the formation of the optical stack 16 over the substrate 20. FIG.

4A illustrates such an optical stack 16 formed over the substrate 20. The substrate 20 may be a transparent substrate such as glass or plastic such as the materials discussed above with respect to FIG. 1. The substrate 20 may be flexible or relatively stiff and unbending, and may have been subjected to prior preparation processes, such as cleaning, to facilitate efficient formation of the optical stack 16. As discussed above, the optical stack 16 can be electrically conductive, partially transparent, partially reflective, and partially absorptive, and may be fabricated, for example, by depositing one or more layers having the desired properties onto the transparent substrate 20.

Figure 4A:
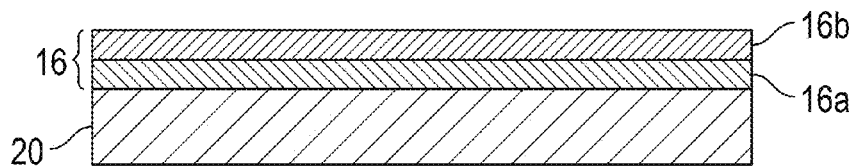
FIGS. 4A-4E show cross-sectional illustrations of various stages in an example process of making an IMOD display or display element.

In FIG. 4A, the optical stack 16 includes a multilayer structure having sub-layers 16a and 16b, although more or fewer sub-layers may be included in some other implementations. In some implementations, one of the sub-layers 16a and 16b can include both optically absorptive and electrically conductive properties, such as the combined conductor/absorber sub-layer 16a. In some implementations, one of the sub-layers 16a and 16b can include molybdenum-chromium (molychrome or MoCr), or other materials with a suitable complex refractive index. Additionally, one or more of the sub-layers 16a and 16b can be patterned into parallel strips, and may form row electrodes in a display device. Such patterning can be performed by a masking and etching process or another suitable process known in the art. In some implementations, one of the sub-layers 16a and 16b can be an insulating or dielectric layer, such as an upper sub-layer 16b that is deposited over one or more underlying metal and/or oxide layers (such as one or more reflective and/or conductive layers). In addition, the optical stack 16 can be patterned into individual and parallel strips that form the rows of the display. In some implementations, at least one of the sub-layers of the optical stack, such as the optically absorptive layer, may be quite thin (e.g., relative to other layers depicted in this disclosure), even though the sub-layers 16a and 16b are shown somewhat thick in FIGS. 4A-4E.

Figure 4B:
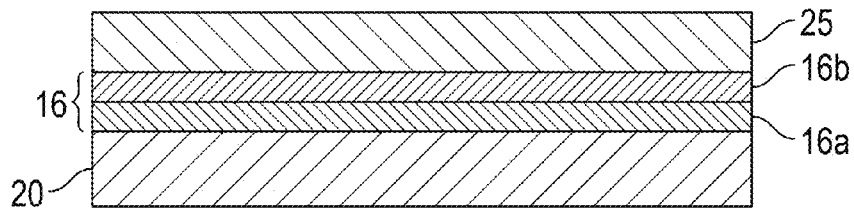

The process 80 continues at block 84 with the formation of a sacrificial layer 25 over the optical stack 16. Because the sacrificial layer 25 is later removed (see block 90) to form the cavity 19, the sacrificial layer 25 is not shown in the resulting IMOD display elements. FIG. 4B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIG. 4E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 4C:
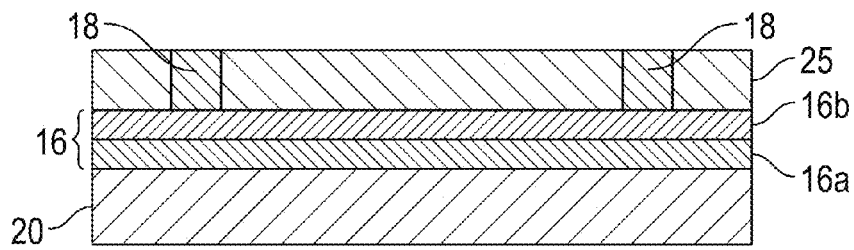
Figure 4D:
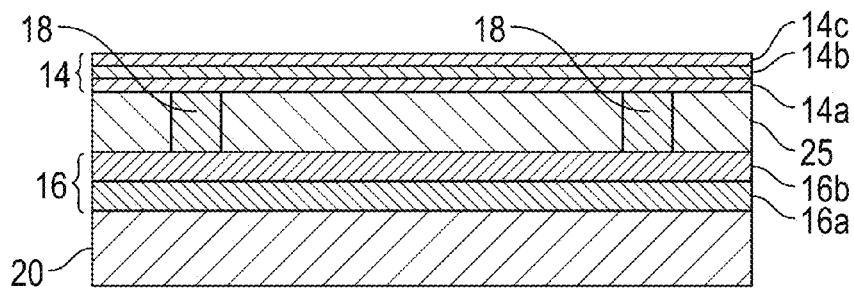
Figure 4E:
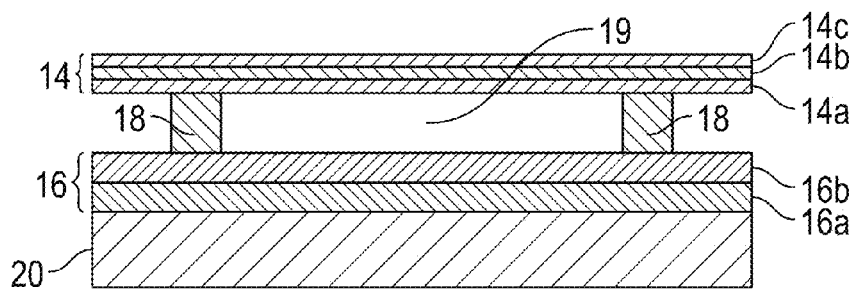

The process 80 continues at block 86 with the formation of a support structure such as a support post 18. The formation of the support post 18 may include patterning the sacrificial layer 25 to form a support structure aperture, then depositing a material (such as a polymer or an inorganic material, like silicon oxide) into the aperture to form the support post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the support post 18 contacts the substrate 20. Alternatively, as depicted in FIG. 4C, the aperture formed in the sacrificial layer 25 can extend through the sacrificial layer 25, but not through the optical stack 16. For example, FIG. 4E illustrates the lower ends of the support posts 18 in contact with an upper surface of the optical stack 16. The support post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 4C, but also can extend at least partially over a portion of the sacrificial layer 25. As noted above, the patterning of the sacrificial layer 25 and/or the support posts 18 can be performed by a masking and etching process, but also may be performed by alternative patterning methods.

The process 80 continues at block 88 with the formation of a movable reflective layer or membrane such as the movable reflective layer 14 illustrated in FIG. 44. The movable reflective layer 14 may be formed by employing one or more deposition steps, including, for example, reflective layer (such as aluminum, aluminum alloy, or other reflective materials) deposition, along with one or more patterning, masking and/or etching steps. The movable reflective layer 14 can be patterned into individual and parallel strips that form, for example, the columns of the display. The movable reflective layer 14 can be electrically conductive, and referred to as an electrically conductive layer. In some implementations, the movable reflective layer 14 may include a plurality of sub-layers 14a, 14b and 14c as shown in FIG. 4D. In some implementations, one or more of the sub-layers, such as sub-layers 14a and 14c, may include highly reflective sub-layers selected for their optical properties, and another sub-layer 14b may include a mechanical sub-layer selected for its mechanical properties. In some implementations, the mechanical sub-layer may include a dielectric material. Since the sacrificial layer 25 is still present in the partially fabricated IMOD display element formed at block 88, the movable reflective layer 14 is typically not movable at this stage. A partially fabricated IMOD display element that contains a sacrificial layer 25 also may be referred to herein as an "unreleased" IMOD.

The process 80 continues at block 90 with the formation of a cavity 19. The cavity 19 may be formed by exposing the sacrificial material 25 (deposited at block 84) to an etchant. For example, an etchable sacrificial material such as Mo or amorphous Si may be removed by dry chemical etching by exposing the sacrificial layer 25 to a gaseous or vaporous etchant, such as vapors derived from solid $XeF_2$ for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD display element may be referred to herein as a "released" IMOD.

In some implementations, the packaging of an EMS component or device, such as an IMOD-based display, can include a backplate (alternatively referred to as a backplane, back glass or recessed glass) which can be capable of protecting the EMS components from damage (such as from mechanical interference or potentially damaging substances). The backplate also can provide structural support for a wide range of components, including but not limited to driver circuitry, processors, memory, interconnect arrays, vapor barriers, product housing, and the like. In some implementations, the use of a backplate can facilitate integration of components and thereby reduce the volume, weight, and/or manufacturing costs of a portable electronic device.

Figure 5A:
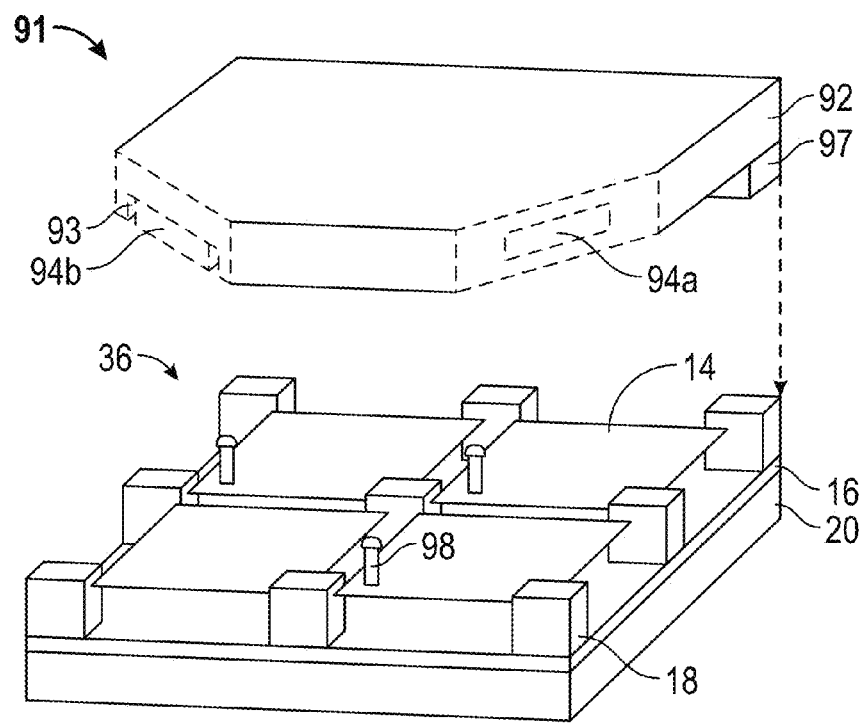
FIGS. 5A and 5B are schematic exploded partial perspective views of a portion of an electromechanical systems (EMS) package including an array of EMS elements and a backplate.
Figure 5B:
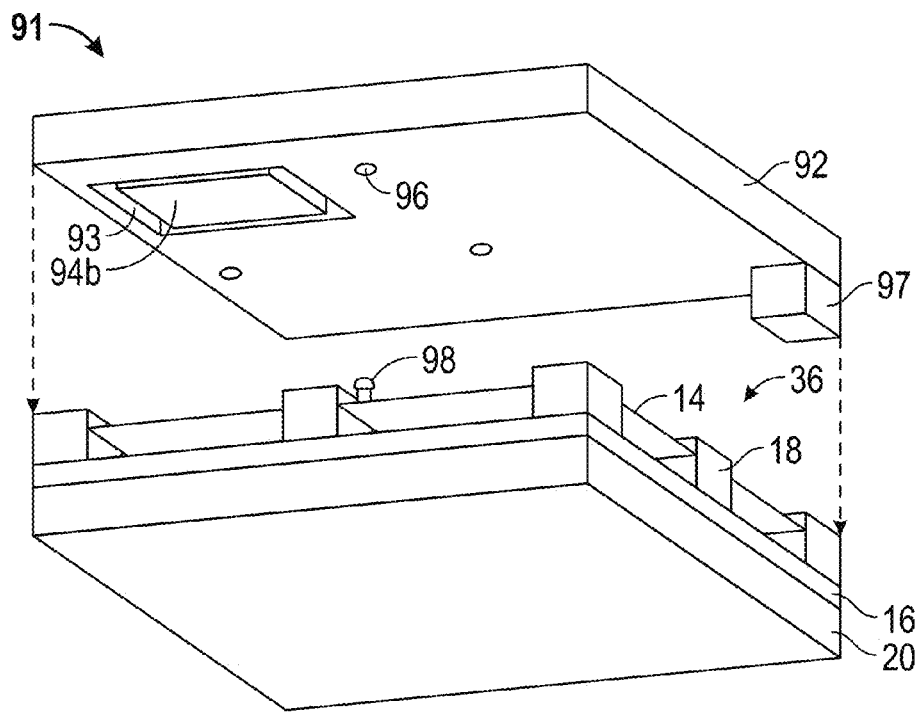

FIGS. 5A and 5B are schematic exploded partial perspective views of a portion of an EMS package 91 including an array 36 of EMS elements and a backplate 92. FIG. 5A is shown with two corners of the backplate 92 cut away to better illustrate certain portions of the backplate 92, while FIG. 5B is shown without the corners cut away. The EMS array 36 can include a substrate 20, support posts 18, and a movable layer 14. In some implementations, the EMS array 36 can include an array of IMOD display elements with one or more optical stack portions 16 on a transparent substrate, and the movable layer 14 can be implemented as a movable reflective layer.

The backplate 92 can be essentially planar or can have at least one contoured surface (e.g., the backplate 92 can be formed with recesses and/or protrusions). The backplate 92 may be made of any suitable material, whether transparent or opaque, conductive or insulating. Suitable materials for the backplate 92 include, but are not limited to, glass, plastic, ceramics, polymers, laminates, metals, metal foils, Kovar and plated Kovar.

As shown in FIGS. 5A and 5B, the backplate 92 can include one or more backplate components 94a and 94b, which can be partially or wholly embedded in the backplate 92. As can be seen in FIG. 5A, backplate component 94a is embedded in the backplate 92. As can be seen in FIGS. 5A and 5B, backplate component 94b is disposed within a recess 93 formed in a surface of the backplate 92. In some implementations, the backplate components 94a and/or 94b can protrude from a surface of the backplate 92. Although backplate component 94b is disposed on the side of the backplate 92 facing the substrate 20, in other implementations, the backplate components can be disposed on the opposite side of the backplate 92.

The backplate components 94a and/or 94b can include one or more active or passive electrical components, such as transistors, capacitors, inductors, resistors, diodes, switches, and/or integrated circuits (ICs) such as a packaged, standard or discrete IC. Other examples of backplate components that can be used in various implementations include antennas, batteries, and sensors such as electrical, touch, optical, or chemical sensors, or thin-film deposited devices.

In some implementations, the backplate components 94a and/or 94b can be in electrical communication with portions of the EMS array 36. Conductive structures such as traces, bumps, posts, or vias may be formed on one or both of the backplate 92 or the substrate 20 and may contact one another or other conductive components to form electrical connections between the EMS array 36 and the backplate components 94a and/or 94b. For example, FIG. 5B includes one or more conductive vias 96 on the backplate 92 which can be aligned with electrical contacts 98 extending upward from the movable layers 14 within the EMS array 36. In some implementations, the backplate 92 also can include one or more insulating layers that electrically insulate the backplate components 94a and/or 94b from other components of the EMS array 36. In some implementations in which the backplate 92 is formed from vapor-permeable materials, an interior surface of backplate 92 can be coated with a vapor barrier (not shown).

The backplate components 94a and 94b can include one or more desiccants which act to absorb any moisture that may enter the EMS package 91. In some implementations, a desiccant (or other moisture absorbing materials, such as a getter) may be provided separately from any other backplate components, for example as a sheet that is mounted to the backplate 92 (or in a recess formed therein) with adhesive. Alternatively, the desiccant may be integrated into the backplate 92. In some other implementations, the desiccant may be applied directly or indirectly over other backplate components, for example by spray-coating, screen printing, or any other suitable method.

In some implementations, the EMS array 36 and/or the backplate 92 can include mechanical standoffs 97 to maintain a distance between the backplate components and the display elements and thereby prevent mechanical interference between those components. In the implementation illustrated in FIGS. 5A and 5B, the mechanical standoffs 97 are formed as posts protruding from the backplate 92 in alignment with the support posts 18 of the EMS array 36. Alternatively or in addition, mechanical standoffs, such as rails or posts, can be provided along the edges of the EMS package 91.

Although not illustrated in FIGS. 5A and 5B, a seal can be provided which partially or completely encircles the EMS array 36. Together with the backplate 92 and the substrate 20, the seal can form a protective cavity enclosing the EMS array 36. The seal may be a semi-hermetic seal, such as a conventional epoxy-based adhesive. In some other implementations, the seal may be a hermetic seal, such as a thin film metal weld or a glass frit. In some other implementations, the seal may include polyisobutylene (PIB), polyurethane, liquid spin-on glass, solder, polymers, plastics, or other materials. In some implementations, a reinforced sealant can be used to form mechanical standoffs.

In alternate implementations, a seal ring may include an extension of either one or both of the backplate 92 or the substrate 20. For example, the seal ring may include a mechanical extension (not shown) of the backplate 92. In some implementations, the seal ring may include a separate member, such as an O-ring or other annular member.

In some implementations, the EMS array 36 and the backplate 92 are separately formed before being attached or coupled together. For example, the edge of the substrate 20 can be attached and sealed to the edge of the backplate 92 as discussed above. Alternatively, the EMS array 36 and the backplate 92 can be formed and joined together as the EMS package 91. In some other implementations, the EMS package 91 can be fabricated in any other suitable manner, such as by forming components of the backplate 92 over the EMS array 36 by deposition.

FIGS. 6A-6E show examples of how a multi-state IMOD (MS-IMOD) may be configured to produce different colors. As noted above, analog IMODs (A-IMODs) and multi-state IMODs (MS-IMODs) are considered to be examples of the broader class of MS-IMODs.

In an MS-IMOD, a pixel's reflective color may be varied by changing the gap height between an absorber stack and a reflector stack. In FIGS. 6A-6E, the MS-IMOD 600 includes the mirror stack 605 and the absorber stack 610. In this implementation, the absorber stack 610 is partially reflective and partially absorptive. Here, the mirror stack 605 includes at least one metallic reflective layer, which also may be referred to herein as a mirrored surface or a metal mirror.

In some implementations, an absorber layer of the absorber stack 610 may be formed of a partially absorptive and partially reflective layer. The absorber layer may be part of an absorber stack that includes other layers, such as one or more dielectric layers, an electrode layer, etc. According to some such implementations, the absorber stack 610 may include a dielectric layer, a metal layer and a passivation layer. In some implementations, the dielectric layer may be formed of silicon dioxide ($SiO_2$), silicon oxynitride (SiON), magnesium fluoride ($MgF_2$), aluminum oxide ($Al_2O_3$) and/or other dielectric materials. In some implementations, the metal layer may be formed of chromium (Cr) and/or molychrome (MoCr, a molybdenum-chromium alloy). In some implementations, the passivation layer may include $Al_2O_3$ or another dielectric material.

The mirrored surface may, for example, be formed of a reflective metal such as aluminum (Al), silver (Ag), etc. The mirrored surface may be part of a reflector stack that includes other layers, such as one or more dielectric layers. Such dielectric layers may be formed of titanium oxide ($TiO_2$), silicon nitride ($Si_3N_4$), zirconium oxide ($ZrO_2$), tantalum pentoxide ($Ta_2O_5$), antimony trioxide ($Sb_2O_3$), hafnium(IV) oxide ($HfO_2$), scandium(III) oxide ($Sc_2O_3$), indium(III) oxide ($In_2O_3$), tin-doped indium(III) oxide (Sn:$In_2O_3$), $SiO_2$, SiON, $MgF_2$, $Al_2O_3$, hafnium fluoride ($HfF_4$), ytterbium(III) fluoride ($YbF_3$), cryolite ($Na_3AlF_6$) and/or other dielectric materials.

In FIGS. 6A-6E, the mirror stack 605 is shown at five positions relative to the absorber stack 610. However, an MS-IMOD 600 may be movable between substantially more than 5 positions relative to the mirror stack 605. For example, some MS-IMODs may be positioned in 8 or more gap heights 630, 10 or more gap heights 630, 16 or more gap heights 630, 20 or more gap heights 630, 32 or more gap heights 630, etc. Some MS-IMODs also may be configured in gap heights 630 that correspond to other colors, such as yellow, orange, violet, cyan and/or magenta. In some A-IMOD implementations, the gap height 630 between the mirror stack 605 and the absorber stack 610 may be varied in a substantially continuous manner. In some such MS-IMODs 600, the gap height 630 may be controlled with a high level of precision, e.g., with an error of 10 nm or less.

Although the absorber stack 610 includes a single absorber layer in this example, alternative implementations of the absorber stack 610 may include multiple absorber layers. Moreover, in alternative implementations, the absorber stack 610 may not be partially reflective.

An incident wave having a wavelength $\lambda$ will interfere with its own reflection from the mirror stack 605 to create a standing wave with local peaks and nulls. The first null is $\lambda/2$ from the mirror and subsequent nulls are located at $\lambda/2$ intervals. For that wavelength, a thin absorber layer placed at one of the null positions will absorb very little energy.

Figure 6A:
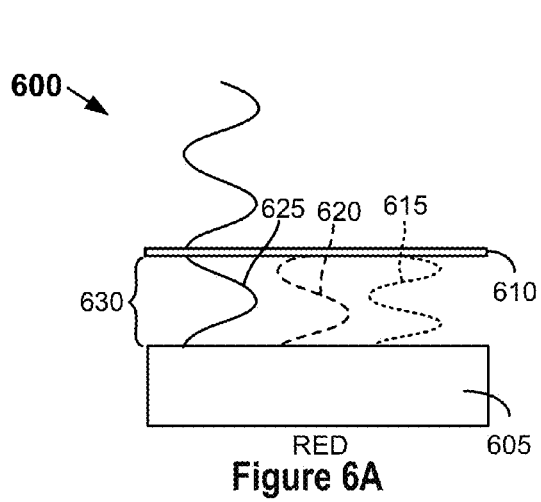
FIGS. 6A-6E show examples of how a multi-state IMOD (MS-IMOD) may be configured to produce different colors.

Referring first to FIG. 6A, when the gap height 630 is substantially equal to the half wavelength of a red wavelength of light 625 (also referred to herein as a red color), the absorber stack 610 is positioned at the null of the red standing wave interference pattern. The absorption of the red wavelength of light 625 is near zero because there is almost no red light at the absorber. At this configuration, constructive interference appears between red wavelengths of light reflected from the absorber stack 610 and red wavelengths of light reflected from the mirror stack 605. Therefore, light having a wavelength substantially corresponding to the red wavelength of light 625 is reflected efficiently. Light of other colors, including the blue wavelength of light 615 and the green wavelength of light 620, has a high intensity field at the absorber and is not reinforced by constructive interference. Instead, such light is substantially absorbed by the absorber stack 610.

Figure 6B:
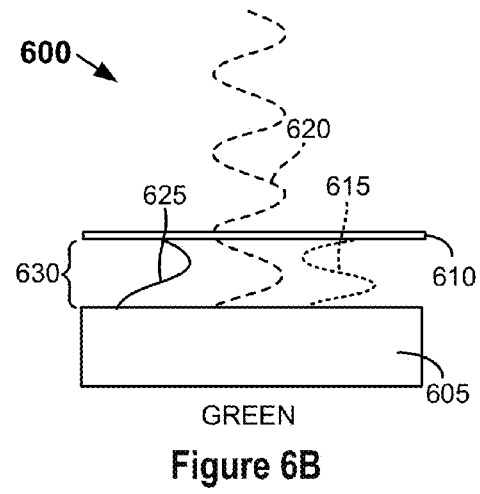

FIG. 6B depicts the MS-IMOD 600 in a configuration wherein the mirror stack 605 is moved closer to the absorber stack 610 (or vice versa). In this example, the gap height 630 is substantially equal to the half wavelength of the green wavelength of light 620. The absorber stack 610 is positioned at the null of the green standing wave interference pattern. The absorption of the green wavelength of light 620 is near zero because there is almost no green light at the absorber. At this configuration, constructive interference appears between green light reflected from the absorber stack 610 and green light reflected from the mirror stack 605. Light having a wavelength substantially corresponding to the green wavelength of light 620 is reflected efficiently. Light of other colors, including the red wavelength of light 625 and the blue wavelength of light 615, is substantially absorbed by the absorber stack 610.

Figure 6C:
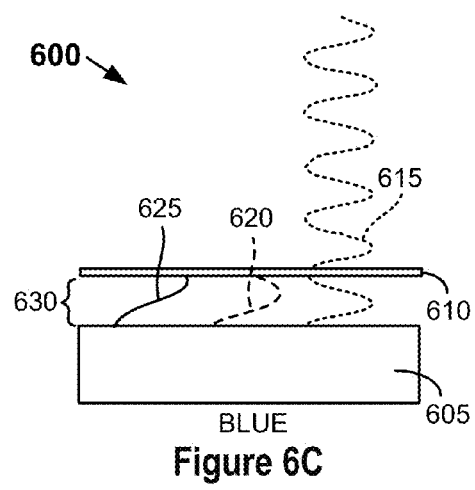

In FIG. 6C, the mirror stack 605 is moved closer to the absorber stack 610 (or vice versa), so that the gap height 630 is substantially equal to the half wavelength of the blue wavelength of light 615. Light having a wavelength substantially corresponding to the blue wavelength of light 615 is reflected efficiently. Light of other colors, including the red wavelength of light 625 and the green wavelength of light 620, is substantially absorbed by the absorber stack 610.

Figure 6D:
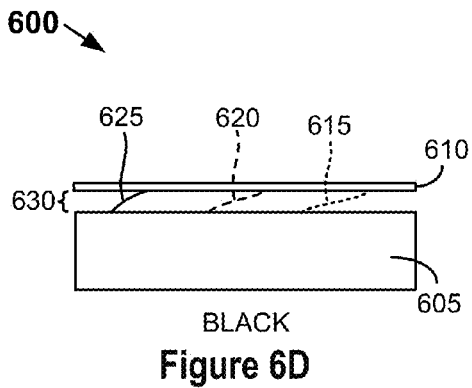

In FIG. 6D, however, the MS-IMOD 600 is in a configuration wherein the gap height 630 is substantially equal to ¼ of the wavelength of the average color in the visible range. In such arrangement, the absorber is located near the intensity peak of the interference standing wave; the strong absorption due to high field intensity together with destructive interference between the absorber stack 610 and the mirror stack 605 causes relatively little visible light to be reflected from the MS-IMOD 600. This configuration may be referred to herein as a "black state." In some such implementations, the gap height 630 may be made larger or smaller than shown in FIG. 6D, in order to reinforce other wavelengths that are outside the visible range. Accordingly, the configuration of the MS-IMOD 600 shown in FIG. 6D provides merely one example of a black state configuration of the MS-IMOD 600.

Figure 6E:
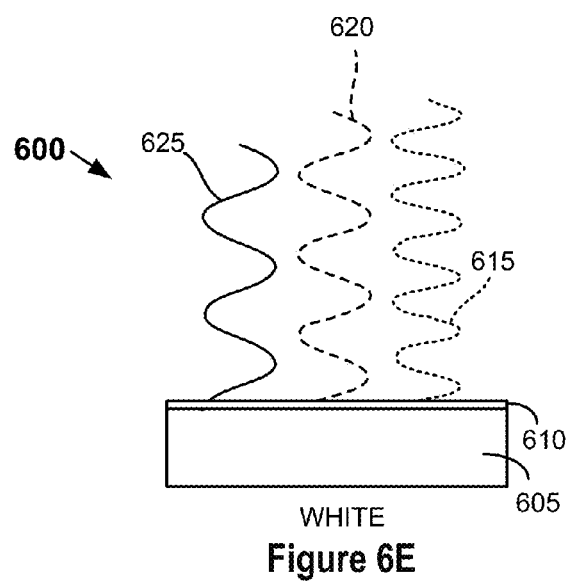

FIG. 6E depicts the MS-IMOD 600 in a configuration wherein the absorber stack 610 is in close proximity to the mirror stack 605. In this example, the gap height 630 is negligible because the absorber stack 610 is substantially adjacent to the mirror stack 605. Light having a broad range of wavelengths is reflected efficiently from the mirror stack 605 without being absorbed to a significant degree by the absorber stack 610. This configuration may be referred to herein as a "white state." However, in some implementations the absorber stack 610 and the mirror stack 605 may be separated to reduce stiction caused by charging via the strong electric field that may be produced when the two layers are brought close to one another. In some implementations, one or more dielectric layers with a total thickness of about $\lambda/2$ may be disposed on the surface of the absorber layer and/or the mirrored surface. As such, the white state may correspond to a configuration wherein the absorber layer is placed at the first null of the standing wave from the mirrored surface of the mirror stack 605.

Off-axis viewing of a reflective display, such as an IMOD display or a polarization control display (e.g., a liquid crystal display (LCD)), can lead to unwanted shifts in color or contrast or both. In an MS-IMOD display, this effect is especially pronounced when a pixel is displaying a reddish color, the longest wavelength in the visible spectrum, as the reflectance peak of any color shifts towards the blue by a wavelength increment which is proportional to the unshifted peak wavelength. This wavelength increment, $\Delta\lambda$, may be expressed as follows:

$$\Delta\lambda = \lambda_{shifted}(1-\cos \alpha) \qquad \text{(Equation 1)}$$

In Equation 1, $\lambda_{unshifted}$ represents the original reflectance peak wavelength and $\alpha$ represents the angle of incidence with respect to a surface normal. These effects are illustrated in FIGS. 7A and 7B.

Figure 7A:
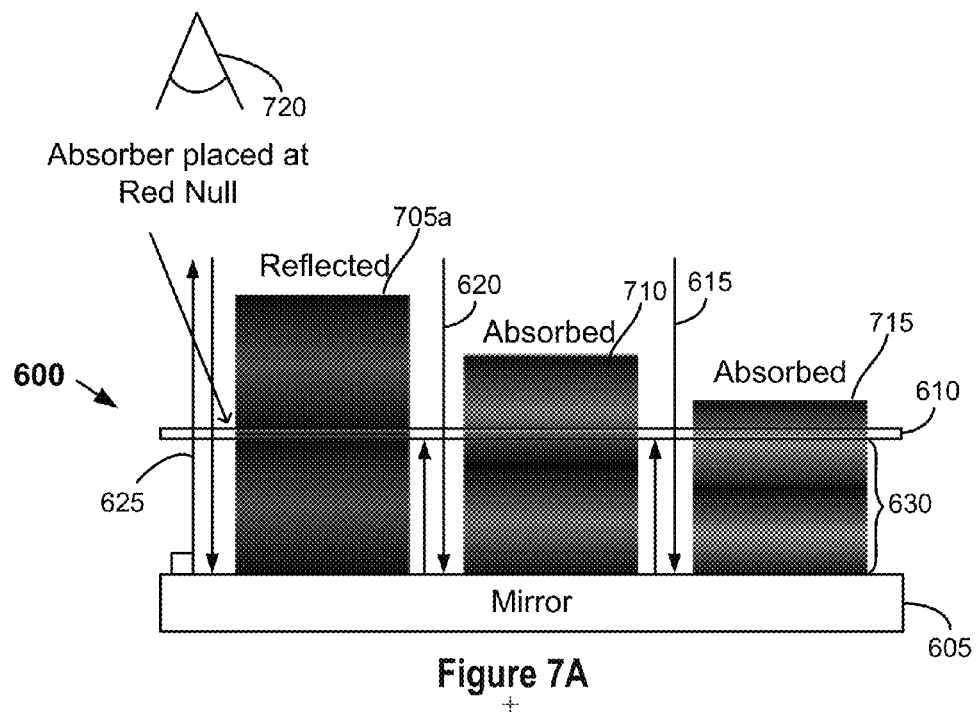
FIG. 7A shows an example of an MS-IMOD being viewed along an axis that is substantially orthogonal to a surface of the mirror stack.
Figure 7B:
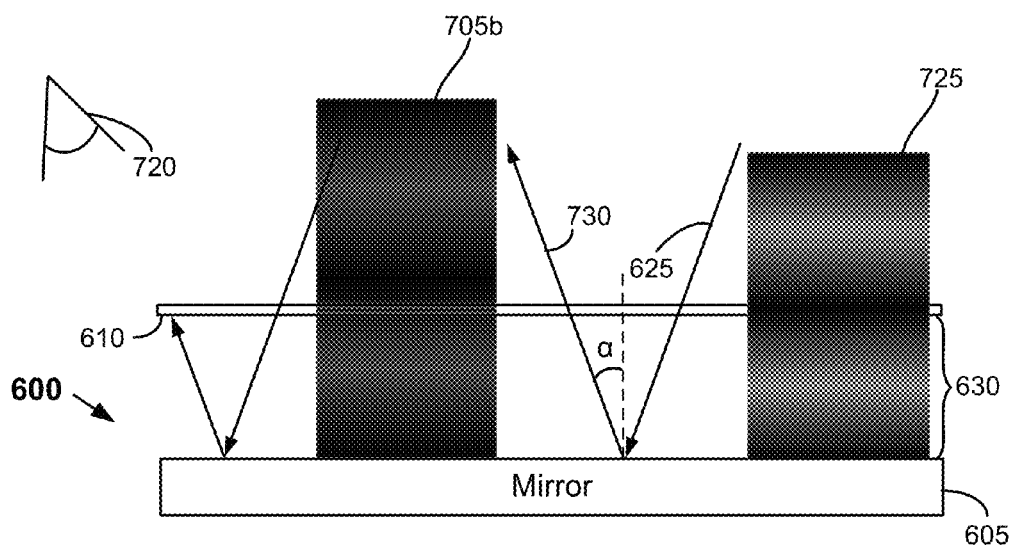
FIG. 7B shows an example of an MS-IMOD being viewed along an axis that is at an angle α to the normal of the surface of the mirror stack.

FIG. 7A shows an example of an MS-IMOD being viewed along an axis that is substantially orthogonal to a surface of the mirror stack. Light incident normal to the mirror stack 605 creates standing wave interference patterns that begin with a zero energy null at the mirror surface and periodically repeat away from the mirror. The null locations repeat every half wavelength. Therefore, the distance between null locations depends on the wavelength of each of the spectral components of light.

FIG. 7A shows examples of a standing wave interference pattern for red wavelengths of light 705a, a standing wave interference pattern for green wavelengths of light 710 and a standing wave interference pattern for blue wavelengths of light 715. The nulls are depicted as the darkest areas of the standing wave interference patterns and the peaks are depicted as the brightest areas of the standing wave interference patterns. Because the red wavelengths of light 625 have the longest wavelengths, the distance between null locations for the red wavelengths of light 625 is greater than that for the green wavelengths of light 620 or the blue wavelengths of light 615.

In the examples shown in FIG. 7A, the absorber stack 610 is positioned at a null of the standing wave interference pattern for red wavelengths of light 705a. The observer 720 is viewing light that is traveling along an axis that is substantially normal to the surface of the mirror stack. The absorber stack 610 causes the light to be absorbed unless the spectral component has a null location at the absorber position, in which case little or no energy is absorbed and the light is reflected with high efficiency.

Therefore, when the MS-IMOD 600 is in the configuration shown in FIG. 7A, the observer 720 can perceive red wavelengths of light 625 reflected from the mirror stack 605. Light of other colors, including the blue wavelengths of light 615 and the green wavelengths of light 620, has a higher intensity field at the absorber location and is substantially absorbed by the absorber stack 610.

FIG. 7B shows an example of an MS-IMOD being viewed along an axis that is at an angle $\alpha$ to the normal of the surface of the mirror stack. The absorber stack 610 is in the same position shown in FIG. 7A. However, while this position of the absorber stack 610 yields a red reflection for normal-incidence viewing, off-axis viewing causes the fringes to stretch by an inverse cosine factor due to the increased distance traveled by the incident and reflected light. This increase in distance causes a shift of the null location, as shown in the standing wave interference pattern for red wavelengths of light 705b, causing some incident red wavelengths of light 625 to be absorbed.

However, a shorter wavelength component at the same incidence angle $\alpha$ has a zero energy null coincident with the same absorber position and thus reflects with high efficiency. This is shown by the standing wave interference pattern for orange wavelengths of light 725. The result is an apparent shift in color (towards the blue range) for the same gap 630 when the observer 720 views the MS-IMOD 600 from an off-axis position. Similar effects are produced when the MS-IMOD 600 is configured for reflecting green, blue or other colors and viewed off-axis.

Figure 8A:
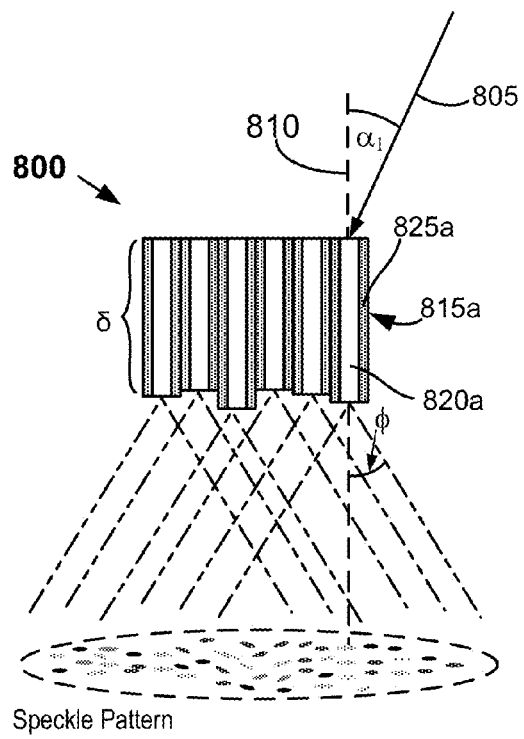
FIGS. 8A and 8B show an example of an array of optical fibers capable of defining a viewing angle range.
Figure 8B:
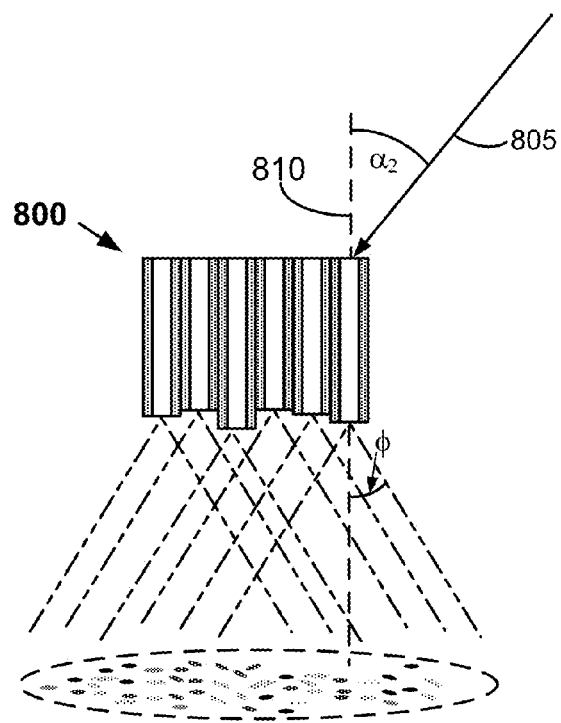

FIGS. 8A and 8B show an example of an array of optical fibers capable of defining a viewing angle range. In this implementation, the light exiting the array of optical fibers 800 is constrained within a range of angles, regardless of the angle of incidence of the light 805 entering the array of optical fibers 800. In FIG. 8A, the light 805 enters the array of optical fibers 800 at an angle of incidence $\alpha_1$ from the axis 810 of the optical fiber 815a and emerges from the optical fiber 815a at an angle that is less than or equal to the viewing angle range $\phi$. In FIG. 8B, the light 805 enters the array of optical fibers 800 at an angle of incidence $\alpha_2$, which is greater than the angle of incidence $\alpha_1$, from the axis 810 of the optical fiber 815a. Nonetheless, the light 805 still emerges from the optical fiber 815a at an angle that is less than or equal to the viewing angle range $\phi$. Light reflected back through the array of optical fibers 800, e.g., from a reflective display, will emerge from the array of optical fibers 800 at angles that are less than or equal to the viewing angle range $\phi$.

In the examples shown in FIGS. 8A and 8B, the light 805 carried in each of the optical fibers 815 emerges as a cone of light having a viewing angle range $\phi$ that matches the numerical aperture of each optical fiber 815. Accordingly, the viewing angle range $\phi$ of the array of optical fibers 800 may be selected by choosing a corresponding numerical aperture for each of the optical fibers 815. The numerical aperture of the optical fiber 815a is a function of the refractive indices of the optical fiber core 820a and the optical fiber cladding material 825a.

Therefore, a predetermined viewing angle range may be obtained by selecting corresponding indices of refraction of the optical fiber core 820a and the optical fiber cladding material 825a of each optical fiber 815 in an array of optical fibers 800. In some implementations, the viewing angle range may be an angle in the range of 30-50 degrees from the axis 810 of the optical fibers 815 of an array of optical fibers 800. In some implementations, the axis 810 may be substantially normal to a display surface.

The numerical aperture of an optical fiber is given by the following equation:

$$NA = \sqrt{n_{core}^2 - n_{clad}^2} \qquad \text{(Equation 2)}$$

In Equation 2, NA represents the numerical aperture of an optical fiber 815, whereas $n_{core}$ and $n_{clad}$ represent the refractive indices of the optical fiber core 820 and the optical fiber cladding material 825, respectively. Because the numerical aperture is also equal to the sine of the half angle of the viewing angle range, a viewing angle range may be determined by selecting appropriate values of $n_{core}$ and $n_{clad}$.

The optical fibers 815 shown in FIGS. 8A and 8B have differing lengths $\delta$. In some implementations, the optical fibers 815 have substantially random lengths $\delta$. When illuminated by an incoherent light source (such as the sun, typical indoor lighting or a typical frontlight or backlight) the light emerging from each fiber in the array may be mutually incoherent. However, in alternative implementations, the optical fibers 815 may have substantially the same length.

In some implementations, each of the optical fibers 815 is longer than a minimum length $\delta_{min}$. The minimum length may be based, at least in part, on the optical fiber's diameter and the index of refraction of the optical fiber core 820. Optical fiber lengths are discussed in more detail below with reference to FIG. 10.

Figure 9:
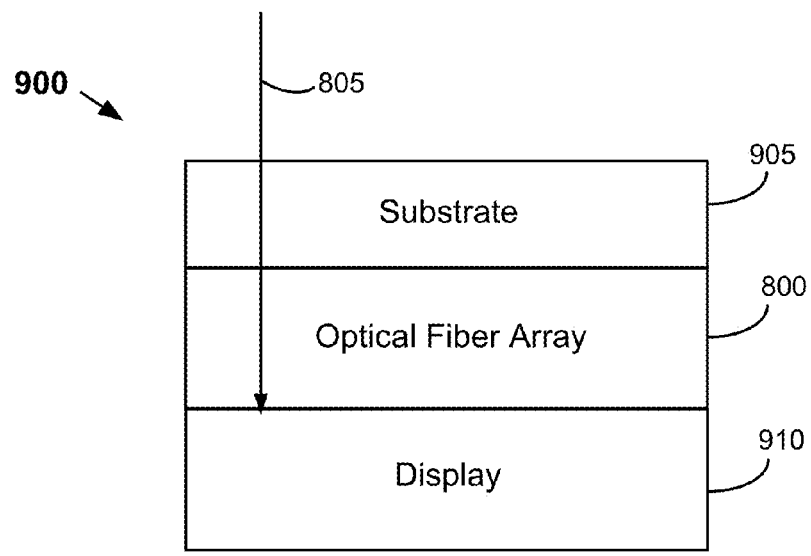
FIG. 9 shows an example of an apparatus that includes an array of optical fibers.

FIG. 9 shows an example of an apparatus that includes an array of optical fibers. In this example, the apparatus 900 includes a substrate 905, which is a substantially transparent substrate in this example. The substrate 905 may include one or more of the materials that may be used to form the transparent substrate 20, which is described above with reference to FIG. 1. In this implementation, the apparatus 900 includes a display 910. The display 910 may, for example, include a reflective display (such as an IMOD display) and/or a polarization control display (such as a liquid crystal display (LCD)). The display 910 may be part of a display device, such as the display device 40 described below with reference to FIGS. 15A and 15B.

Here, the apparatus 900 includes an array of optical fibers 800 disposed between the substrate 905 and the display 910. In some implementations, the array of optical fibers 800 may be fabricated on the substrate 905. The array of optical fibers 800 may be capable of transmitting light 805 between the substrate 905 and the display 910. In some implementations, the array of optical fibers 800 may be capable of defining a viewing angle range for the display 910. As noted above with reference to FIGS. 8A and 8B, incident light may enter the array of optical fibers 800 at various angles of incidence, some of which may be greater than the viewing angle range $\phi$. Nonetheless, for various implementations described herein, the light 805 still emerges from the array of optical fibers 800 and is provided to the display 910 at an angle that is less than or equal to the viewing angle range $\phi$. If the display 910 is a reflective display, light reflected back through the array of optical fibers 800 from the display 910 will emerge from the array of optical fibers 800 at angles that are less than or equal to the viewing angle range $\phi$.

The array of optical fibers 800 may include optical fibers having substantially random lengths. However, in some implementations the optical fibers may be at least a minimum length $\delta_{min}$, and the effect of random lengths can be achieved by an explicit diffuser layer between the fiber array and the display panel. The diffuser layer may include a transparent dielectric layer with a random spatial variation in thickness across the array. In the latter realization, the spatial variation can be designed with a suitable feature size distribution to control the degree of scattering power which in turn, controls the degree of color saturation for the IMOD application.

Figure 10:
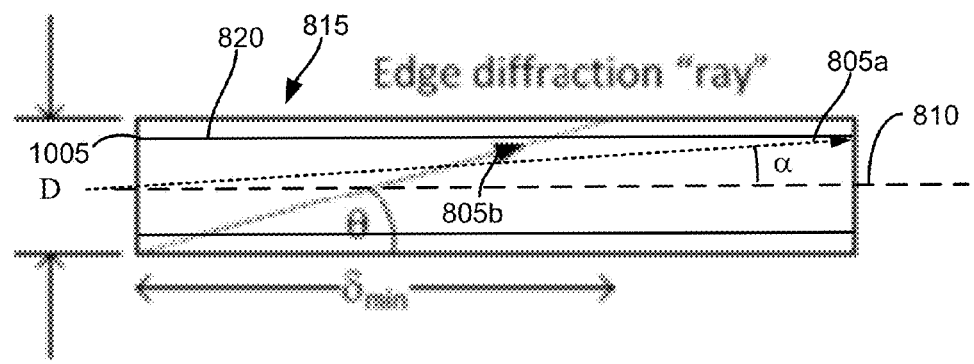
FIG. 10 shows an example of a cross-section of an individual optical fiber.

FIG. 10 shows an example of a cross-section of an individual optical fiber. If the optical fiber 815 were designed to support a range of light incidence angles in a "ballistic" (straight through) mode of propagation in which a beam of light interacts minimally with the core/cladding interface 1005, the exit angle would largely follow that of the incidence angle. For example, incident light 805a that enters the optical fiber 815 at an angle $\alpha$ with the axis 810 will emerge from the optical fiber 815 at the angle $\alpha$ with the axis 810, if the optical fiber core 820 has a substantially constant index of refraction and if the angle $\alpha$ is small enough that the incident light 805a remains within the optical fiber core 820 without refracting off of the interface between the core and cladding interface 1005 (?). This suggests that there is a minimum acceptable fiber length, in order to ensure that light 805 does not pass through the optical fiber 815 without sufficient interaction with the core/cladding interface 1005. The minimum length may be expressed as a function of the diameter and the index of refraction of the optical fiber 815, as well as the wavelengths of light to be propagated through the array of optical fibers 800.

The minimum length is illustrated by the path of the light 805b shown in FIG. 10. Edge diffraction from the boundary between the core and cladding has a defined diffraction angle $\theta$ characterized by the following equation:

$$\theta = \lambda / n_{core} D \tag{Equation 3}$$

In Equation 3, D represents the diameter of the fiber core, $n_{core}$ represents the refractive index of the optical fiber core 820 and represents a wavelength of light. For example, $\lambda$ may represent a wavelength of light that is the shortest, or substantially the shortest, in the visible range.

In order to prevent ballistic transport effects, a diffractive light ray such as the light 805b should strike the opposite wall of the fiber within the length of the fiber. This condition can be applied to determine a minimum length, $\delta_{min}$, for the optical fiber 815, as follows. The angle $\theta$ can be equated to the ratio of D to this minimum length, $\delta_{min}$, to determine the minimum length according to the following equation:

$$\delta_{min} = n_{core}(D^2/\lambda) \tag{Equation 4}$$

If we assume a fiber diameter D of 1.5 microns, an $n_{core}$ value of 1.5 and a $\lambda$ value of 0.4 microns, for example, Equation 4 yields a corresponding minimum optical fiber length of 8.44 um, which is within the realm of lithographic deposition and etch processes. An optical fiber array that includes fibers having at least the minimum length and having a numerical aperture in the range of 0.3 to 0.4 has been shown to produce an acceptably small amount of viewing angle dependency. However, in alternative implementations, an array of optical fibers 800 may include optical fibers having different minimum lengths, different diameters and/or numerical apertures outside of this range. For example, in some implementations D may be less than a micron, e.g., 0.5 microns.

Figure 11:
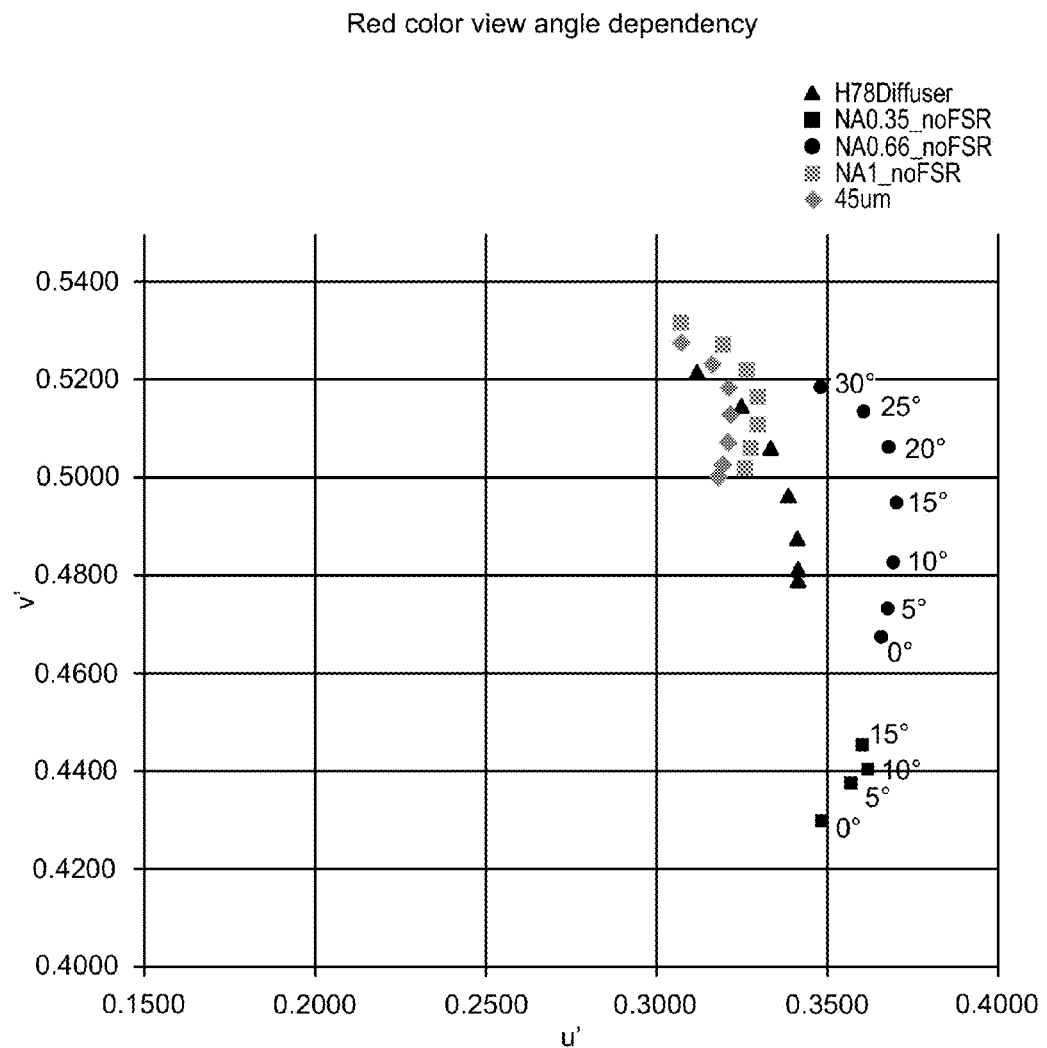
FIG. 11 shows examples of u'v' color space characterization of red color viewing angle dependency.

FIG. 11 shows examples of u'v' color space characterization of a red color sample's viewing angle dependency. In this example, the values shown in FIG. 11 were measured by a DMS Autronic machine (a spectrophotometer with a precision goniometer) while viewing a red color patch on an MS-IMOD. The "NA" values correspond to numerical aperture values of three different arrays of optical fibers 800, each having an optical fiber core diameter of 6 microns. The configurations that have values spread across a relatively greater area in the u'v' color space (e.g., the array of optical fibers having a numerical aperture of 1) are indicating a relatively greater red color viewing angle dependency. The data points corresponding to the H78 diffuser, NA1 fiber array and the 45 um core fiber array all start with the normal incidence condition and move counter clockwise as the incidence angle steps up to 30 degrees inclusive, in 5 degree steps. The important observations are: 1) the fiber array samples, NA0.66 and NA0.35 fiber arrays exhibit much better color saturation as depicted by the distance of the loci from the u'v' plot origin and 2) most of the fiber arrays exhibit much smaller u'v' rotation, indicating a greater level of color constancy.

Although arrays of optical fibers 800 such as those shown in FIGS. 8A and 8B can produce satisfactory results, such implementations may cause a noticeable decrease in the intensity of transmitted light, as compared to incident light. Therefore, it can be desirable to increase the amount of light transmission through the optical fiber array.

Figure 12A:
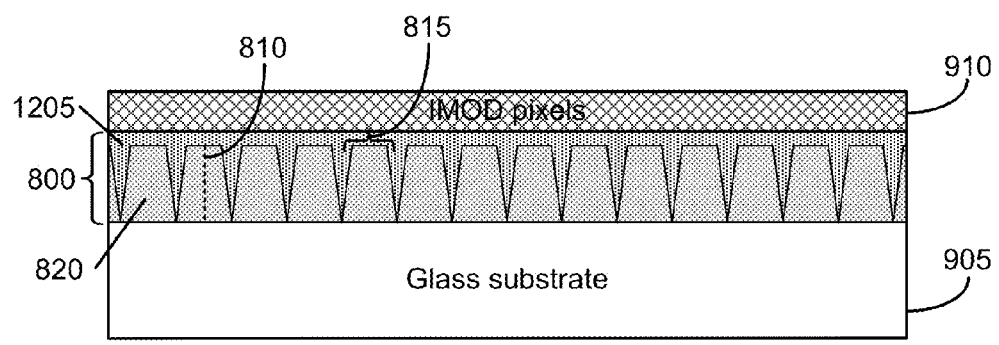
FIGS. 12A and 12B show examples of implementations for increasing the amount of light transmitted through an array of optical fibers.
Figure 12B:
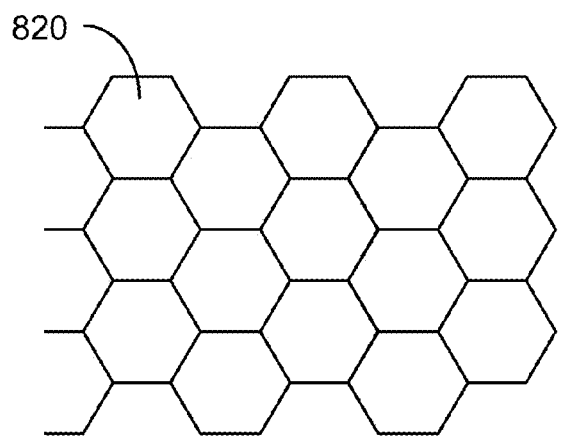

FIGS. 12A and 12B show examples of implementations for increasing the amount of light transmitted through an array of optical fibers. FIG. 12A shows a cross-sectional view of an array of optical fibers 800 disposed on a substantially transparent substrate 905, which is a glass substrate in this example. The array of optical fibers 800 is disposed between the substrate 905 and a display 910, which includes IMOD pixels in this example. However, in other implementations, other types of display pixels may be disposed proximate the optical fiber array. In this implementation, the array of optical fibers 800 has been fabricated on the glass substrate.

Here, the optical fiber cores 820 are tapered, such that the entrance aperture (facing the substrate 905) of the optical fibers 815 is larger than the exit aperture (facing away from the substrate 905). As shown in the bottom view (from the glass substrate side) of FIG. 12B, the optical fibers of the array have a hexagonal cross-section in this example, achieving a near-100% aperture ratio. In some implementations, the optical fiber cores 820 have a graded index of refraction that varies along the axis 810 of the optical fibers 815.

In this implementation, the array of optical fibers 800 has been planarized with a low-index cladding material 1205. In addition to providing a substantially planar surface on which to fabricate the IMOD pixels, the low-index cladding material 1205 also serves as a cladding layer between the optical fiber cores 820. In one example, the low-index cladding material 1205 may include spin-on glass. In some implementations, the low-index cladding material 1205 includes light-absorbing material, such as nanoparticles or quantum dots, or dyes.

As shown above, tapered fibers allow the optical fiber array to achieve a high aperture ratio. However, tapered fibers with a uniform index will reject light incident upon the fiber array 800 from a large angle according to the law of conservation of Etendue, as shown in the following equation:

$$n^2 dS \cos \theta d\Omega = \text{constant.} \quad \text{(Equation 5)}$$

Figure 13:
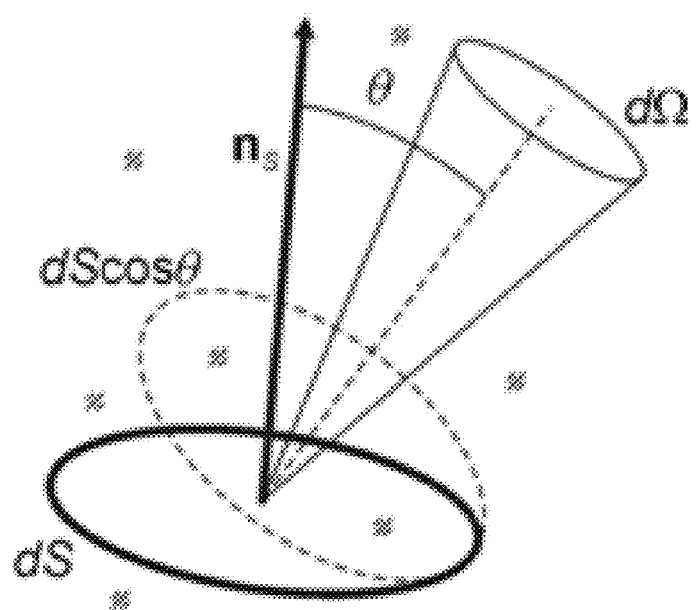
FIG. 13 shows examples of the parameters of Etendue's law of conservation.

FIG. 13 shows examples of the parameters of Etendue's law of conservation. In this example, an infinitesimal surface element dS, with normal $n_s$, is immersed in a medium of refractive index n. The surface is crossed by (or emits) light confined to a solid angle $d\Omega$, at an angle $\theta$ with the normal $n_s$. The area of dS projected in the direction of the light propagation is $dS \cos \theta$. If the angle of incidence is within solid angle $d\Omega$, we can assume that $\theta=0$.

For tapered optical fiber cores 820 having a uniform index of refraction, when the fiber exit area (dS) is reduced, the solid angle $d\Omega$ of the light leaving the fiber increases. Light will either be absorbed or reflected back when $d\Omega$ of the exit light angle exceeds the numerical aperture (NA) of the fiber. In addition, the amplification of the light angle increases color desaturation.

Equation 5 has been re-written in a different form below:

$$d\Omega_{out} = \frac{n_{in}^2 dS_{in}}{n_{out}^2 dS_{out}} d\Omega_{in} \quad \text{(Equation 5')}$$

Referring to Equation 5', we can see that if the refractive index at the fiber exit surface ($n_{out}$) is larger than that at the entrance ($n_{in}$), we have the opportunity to achieve the following: (1) reducing the exit aperture ($dS_{out}$) without increasing exiting light cone angle ($d\Omega_{out}$) or decreasing the viewing angle ($d\Omega_{in}$); and (2) decreasing ($d\Omega_{out}$) with the same or even larger viewing angle ($d\Omega_{in}$), thereby achieving better color saturation.

Figure 14A:
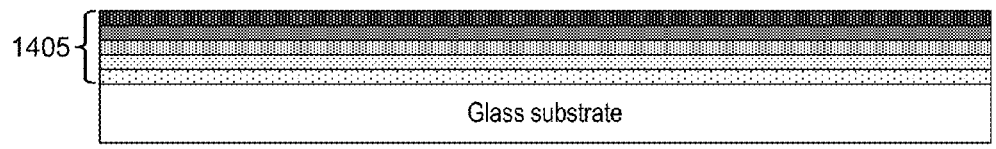
FIGS. 14A-14C illustrate a process of fabricating an array of optical fibers having optical fiber cores with graded indices of refraction.
Figure 14B:
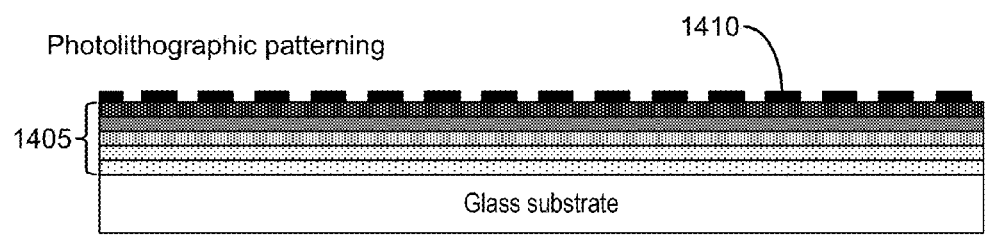
Figure 14C:
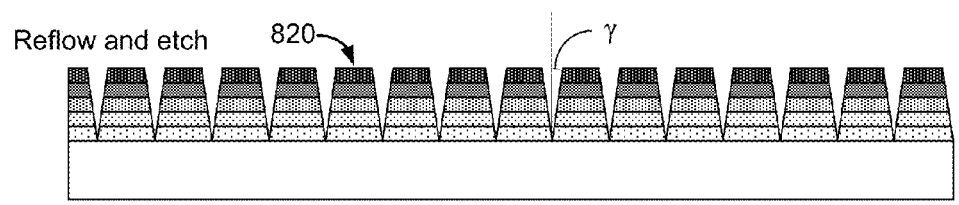

FIGS. 14A-14C illustrate a process of fabricating an array of optical fibers having optical fiber cores with graded indices of refraction. Referring first to FIG. 14A, thin film layers are deposited sequentially on a glass substrate (e.g., an IMOD glass substrate), starting with a low-index material, in this example. The refractive index of each of the subsequent layers may be greater than the underlying layer, so that the index of refraction of the optical fiber core stack 1405 gradually increases. The overall thickness of the optical fiber core stack 1405 may be made greater than or equal to a minimum desired optical fiber length, e.g., as described above.

In one example, a thin film of $TiO_2$ is deposited on the substrate. Then, a thin film of $Si_3N_4$ is deposited on the $TiO_2$ layer. Additional thin film layers of $Al_2O_3$, $SiO_2$ and $MgF_2$ are then deposited in sequence. However, in alternative implementations, more or fewer layers may be deposited. Moreover, different materials may be used in the optical fiber core stack 1405.

In alternative examples, the same material may be used for the entire optical fiber core 820, but the deposition method may be altered in order to gradually increase the index of refraction. In one such example, silicon oxynitride (SiON) may first be deposited by physical vapor deposition (PVD) or chemical vapor deposition (CVD). By changing the ratio of oxygen and nitrogen, the refractive index of the SiON thin film can be tuned.

As shown in FIG. 14B, the optical fiber core stack 1405 may then be patterned with photoresist 1410, in order to define the narrow ends of the tapered optical fiber cores 820. This process may be followed by a reflow process of heating and profiling the photoresist 1410. The optical fiber core stack 1405 may then be etched in order to achieve a desired taper angle γ, as shown in FIG. 14C. Alternatively, a grayscale mask may be used to achieve the desired taper angle γ.

A low-index cladding material may be deposited between the tapered optical fiber cores 820, as shown in FIG. 12A. In some implementations, the low-index cladding material 1205 may include light-absorbing material.

Figure 15A:
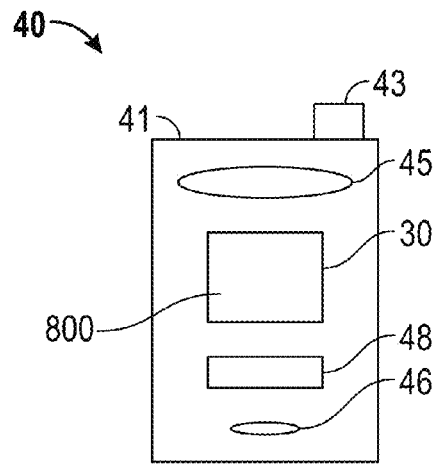
FIGS. 15A and 15B show system block diagrams illustrating an example display device that may include a plurality of IMOD display elements.
Figure 15B:
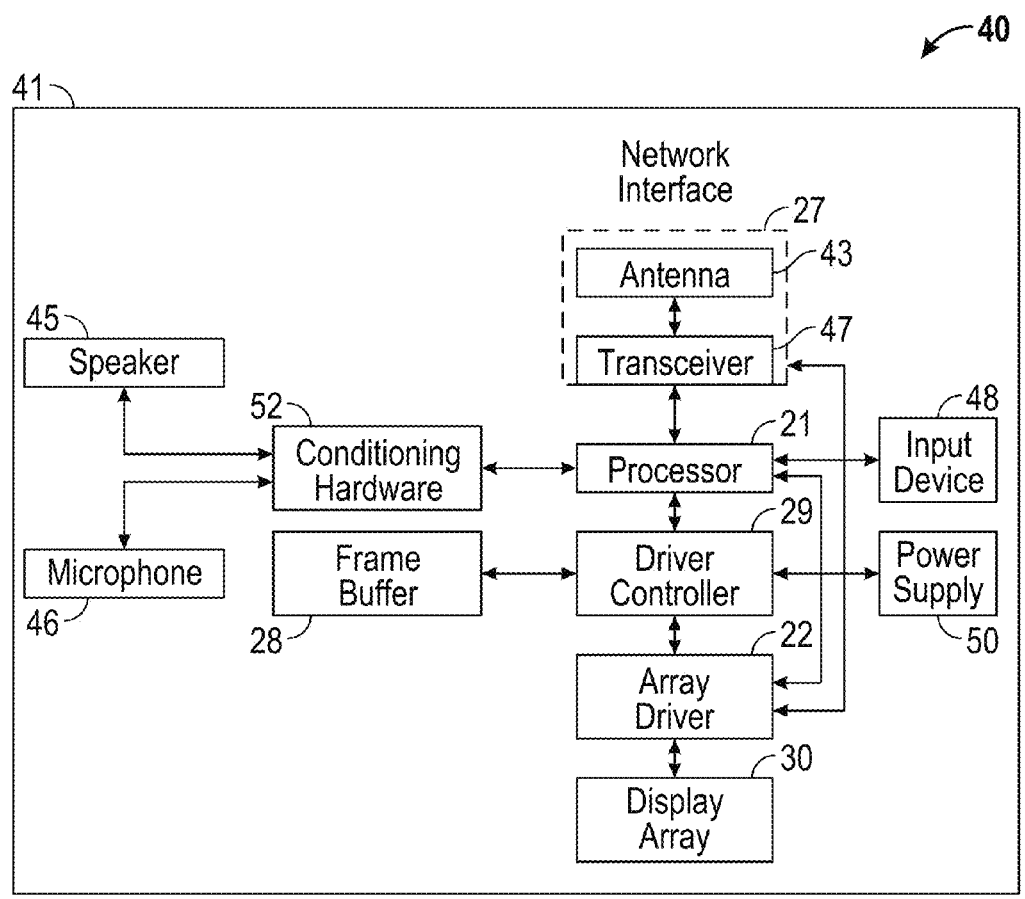

FIGS. 15A and 15B show system block diagrams illustrating an example display device that includes a plurality of IMOD display elements. In some implementations, the IMOD display elements may be MS-IMOD display elements as described elsewhere herein. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols. Some implementations of the display device 40 may include a light source, such as a front light or a back light, for the display 30. In some implementations, the light source may be an incoherent light source.

The display 30 may be any of a variety of displays, including a bi-stable or analog display, as described herein. The display 30 also can include a flat-panel display, such as plasma, EL, OLED, STN LCD, or TFT LCD, or a non-flat-panel display, such as a CRT or other tube device. In addition, the display 30 can include an IMOD-based display. The display may include MS-IMODs such as those described herein.

In this example, the display device 40 includes an array of optical fibers 800 disposed on the display 30. The array of optical fibers 800 may be capable of defining a viewing angle range for the display 30. The array of optical fibers 800 may include optical fibers having substantially random lengths. In some implementations, the array of optical fibers 800 may include tapered optical fibers that are capable of increasing the amount of light transmitted through the optical fiber array. The refractive indices of optical fiber cores in the array of optical fibers 800 may vary along the axis of the optical fibers.

The components of the display device 40 are schematically illustrated in FIG. 15A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be capable of conditioning a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 15A, can be capable of functioning as a memory device and be capable of communicating with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. In some implementations, the processor 21 may correspond with, or form a component of, a control system. The driver controller 29 and/or the array driver also may be considered to be components of the control system. Accordingly, in some implementations, the processor 21, the driver controller 29 and/or the array driver may be capable of performing, at least in part, the methods described herein. For example, the processor 21, the driver controller 29 and/or the array driver may be part of a control system that is capable of controlling the absorber stacks 610 and the mirror stacks 605 of MS-IMODs 600 of the display 30 to be positioned in a plurality of positions relative to one another. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller, a bi-stable display controller or a multi-state display controller (such as an IMOD display element controller). Additionally, the array driver 22 can be a conventional driver, a bi-stable display driver or a multi-state display driver (such as an IMOD display element driver). Moreover, the display array 30 can be a conventional display array, a bi-stable display array or a multi-state display array (such as a display including an array of IMOD display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be capable of allowing, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be capable of functioning as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be capable of receiving power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
 a display;
 a substantially transparent substrate;
 an array of optical fibers disposed between the substrate and the display, the array of optical fibers being capable of transmitting light between the substrate and the display, the array of optical fibers including optical fibers having substantially random lengths; and
 a source of substantially incoherent light capable of illuminating the array of optical fibers, wherein light emerging from a first fiber in the array and light emerging from a second fiber in the array are mutually incoherent.

2. The apparatus of claim 1, wherein the array of optical fibers is capable of defining a viewing angle range for the display.

3. The apparatus of claim 1, wherein the array of optical fibers includes optical fibers having tapered optical fiber cores.

4. The apparatus of claim 3, further comprising low-index optical fiber cladding material disposed between the tapered fiber cores.

5. The apparatus of claim 4, wherein the optical fiber cladding material includes light-absorbing material.

6. The apparatus of claim 1, wherein the array of optical fibers includes optical fibers having optical fiber cores with a graded index of refraction that varies along an axis of the optical fibers.

7. The apparatus of claim 1, wherein the display includes an interferometric modulator (IMOD) display.

8. A display device that includes the apparatus of claim 1.

9. The display device of claim 8, further including a control system capable of controlling the display device, wherein the control system is capable of processing image data.

10. The display device of claim 9, wherein the control system further comprises:
 a driver circuit capable of sending at least one signal to a display of the display device; and
 a controller capable of sending at least a portion of the image data to the driver circuit.

11. The display device of claim 9, wherein the control system further comprises:
 a processor; and
 an image source module capable of sending the image data to the processor, wherein the image source module includes at least one of a receiver, transceiver, and transmitter.

12. The display device of claim 9, further comprising:
 an input device capable of receiving input data and of communicating the input data to the control system.

13. An apparatus, comprising:
 means for displaying images;
 a substantially transparent substrate;
 means for transmitting light between the substrate and the display, wherein the means for transmitting light includes an array of optical fibers disposed between the substrate and the means for displaying images, the array of optical fibers being capable of defining a viewing angle range for the display; and
 a source of substantially incoherent light capable of illuminating the array of optical fibers, wherein light emerging from a first fiber in the array and light emerging from a second fiber in the array are mutually incoherent.

14. The apparatus of claim 13, wherein each optical fiber of the array of optical fibers includes an optical fiber core and an optical fiber cladding and wherein refractive indices of the optical fiber core and the optical fiber cladding are selected to provide the viewing angle range.

15. The apparatus of claim 13, wherein a numerical aperture of each optical fiber is based, at least in part, on a square root of a difference between the refractive indices of the optical fiber core and the optical fiber cladding.

16. The apparatus of claim 13, wherein the array of optical fibers includes optical fibers having substantially random lengths.

17. The apparatus of claim 13, wherein each optical fiber of the array of optical fibers is longer than a minimum length.

18. The apparatus of claim 17, wherein the minimum length is based, at least in part, on an optical fiber diameter and an optical fiber core index of refraction.

19. The apparatus of claim 13, wherein the array of optical fibers includes optical fibers having tapered optical fiber cores.

20. The apparatus of claim 13, wherein the array of optical fibers includes optical fibers having optical fiber cores with a graded index of refraction that varies along an axis of the optical fibers.

* * * * *